(12) United States Patent
van Vossen et al.

(10) Patent No.: US 7,154,812 B2
(45) Date of Patent: Dec. 26, 2006

(54) METHOD FOR RETRIEVING LOCAL NEAR-SURFACE MATERIAL INFORMATION

(75) Inventors: Robbert van Vossen, Utrecht (NL); Andrew Curtis, Edinburgh (GB); Jeannot Trampert, Bunnik (NL)

(73) Assignee: Westerngeco L.L.C., Houston, TX (US)

( * ) Notice: Subject to any disclaimer, the term of this patent is extended or adjusted under 35 U.S.C. 154(b) by 5 days.

(21) Appl. No.: 10/757,217

(22) Filed: Jan. 14, 2004

(65) Prior Publication Data

US 2004/0223411 A1 Nov. 11, 2004

(30) Foreign Application Priority Data

Jan. 15, 2003 (GB) ................................ 0300876.0

(51) Int. Cl.
*G01V 1/24* (2006.01)
*G01V 1/28* (2006.01)

(52) U.S. Cl. .............................. 367/54; 367/38; 367/52

(58) Field of Classification Search ................. 367/54, 367/38, 52, 50, 59, 43
See application file for complete search history.

(56) References Cited

U.S. PATENT DOCUMENTS

| | | | | |
|---|---|---|---|---|
| 4,597,066 | A * | 6/1986 | Frasier ........................ | 367/38 |
| 4,881,209 | A * | 11/1989 | Bloomquist et al. .......... | 367/52 |
| 6,449,560 | B1 * | 9/2002 | Kimball ........................ | 702/6 |
| 6,839,658 | B1 * | 1/2005 | Causse et al. ............... | 702/182 |
| 2003/0117894 | A1 * | 6/2003 | Curtis et al. ................ | 367/58 |
| 2003/0125878 | A1 * | 7/2003 | Bakulin et al. ............... | 702/14 |
| 2003/0195705 | A1 * | 10/2003 | Leaney ........................ | 702/14 |
| 2004/0076077 | A1 * | 4/2004 | Robertsson et al. .......... | 367/15 |

FOREIGN PATENT DOCUMENTS

WO 01/53853 A1 7/2001

OTHER PUBLICATIONS

Ivansson, Sven. "Low-frequency slow-wave dispersion computations by compound-matrix propagation." Journal of the Acoustic Society of America. Jul. 1999.*
Xu, Guo-Ming, et al. "The symmetries of the system matrix and propagator matrix for anisotropic media and of the system matrix for periodically layered media." Geophysics J. Int. (1998).*
Rumpker, et al. "A Maslov-propagator seismogram for weakly anisotropic media." Geophys. J. Int. (2002).*
Xie, Xiao-Bi et al. "Migration of multicomponent seismic data using elastic screen method." SEG Int'l Exposition and Annual Meeting. San Antonio, TX Sep. 9-14, 2001.*
Beaty, Kristen. "Determination of Near-Surface Variability Using Rayleigh Waves." University of Alberta, Department of Physics. Fall 2000.*
Zhu, et al. "Computation of dynamic and static displacement from a point source in multi-layered media." GJI, 2000.*
Silawongsawat, Chanpen. "Elastic Wavefield Modeling by Phase Shift Cascade." Department of Geology and Geophysics, University of Calgary. Jun. 1998.*

(Continued)

*Primary Examiner*—Jack Keith
*Assistant Examiner*—Scott A. Hughes
(74) *Attorney, Agent, or Firm*—Steven Gahlings; Jody Lynn DeStefanis; Dale Gaudier (57) ABSTRACT

The invention concerns a method for retrieving local near-surface material information including the steps of:—providing a group of receivers comprising at least one buried receiver and at least one surface receiver positioned either at or very near the Earth surface;—recording a seismic wavefield;—estimating a propagator from said recorded seismic wavefield;—inverting said propagator; and—retrieving said near-surface material information.

15 Claims, 8 Drawing Sheets

OTHER PUBLICATIONS

Hellberg, et al. "The direct and inverse problem for obliquely incident transient waves." Department of Electroscience Electromagnetic Theory, Lund Institute of Technology, Sweden. May 21, 1997.*

O'Neill, et al. "Full waveform P-SV reflectivity inversion of surface waves for shallow engineering applications." Exploration Geophysics, 2003.*

Mi, et al. "Converted wave prestack depth imaging with the nonstationary wavefield extrapolators." CREWES Research Report, 2001.*

Aki et al Propagator matrices for SH and for P-SV problems Quantitative Seismology, 2$^{nd}$ Ed., University Science Books, 2002, pp. 397-398.

Cho et al Estimation of polarization and slowness in mixed wavefields Geophysics, vol. 57, No. 6, 1992, pp. 805-814.

Curtis et al Volumetric wavefield recording and wave equation inversion for near-surface material properties Geophysics, vol. 67, No. 5, 2002, pp. 1602-1611.

Dankbaar Separation of P- and S-waves Geophysical Prospecting, vol. 33, 1985, pp. 970-986.

de Hoop et al Generation of acoustic waves by an impulsive line source in a fluid/solid configuration with a plane boundary J. Acoust. Soc. Am, vol. 74(1), 1983, pp. 333-342.

Gao et al Imaging of the elastic properties of tissue—a review Ultrasound in medicine and biology, vol. 22, No. 8, 1996, pp. 959-977.

Kähler et al Radiation and receiver pattern of shear and compressional waves as a function of Poisson's Ratio Geophysical Prospecting, vol. 31, 1983, pp. 421-435.

Langston Structure under Mount Rainier, Washington, inferred from teleseismic body waves Journal of Geophysical Research, vol. 84, No. B9, 1979, pp. 4749-4762.

Muijs et al Near-surface seismic properties for elastic wavefield decomposition: Estimates based on multicomponent land and seabed recordings Geophysics, vol. 68, No. 6, 2003, pp. 2073-2081.

Muijs et al Perturbation analysis of an explicit wavefield separation scheme for P- and S-waves Geophysics, vol. 67, No. 6, 2002, pp. 1972-1982.

Muthupillai et al Magnetic resonance elastography by direct visualization of propagating acoustic strain waves Science, vol. 269, 1995, pp. 1854-1857.

Oliphant et al Complex-valued quantitative stiffness estimation using dynamic displacement measurements and local inversion of conservation of momentum IEEE Ultrasonics Symposium, 1999, pp. 1641-1644.

Oliphant et al Complex-valued stiffness reconstruction for magnetic resonance elastography by algebraic inversion of the differential equation Magnetic Resonance In Medicine, vol. 45, 2001, pp. 299-310.

Osen et al Removal of water-layer multiples from multicomponent sea-bottom data Geophysics, vol. 64, No. 3, 1999, pp. 838-851.

Robertsson et al Wavefield separation using a volume distribution of three component recordings Geophysical Research Letters, vol. 26, No. 18, 1999, pp. 2821-2824.

Romano et al Evaluation of a material parameter extraction algorithm using MRI-based displacement measurements IEEE Transactions on Ultrasonics, Ferroelecrics, and Frequency Control, vol. 47, No. 6, 2000, pp. 1575-1581.

Romano et al On the noninvasive determination of material parameters from a knowledge of elastic displacements: theory and numerical simulation IEEE Transactions on Ultrasonics, Ferroelecrics, and Frequency Control, vol. 45, No. 3, 1998, pp. 751-759.

Toksöz et al Velocities of seismic waves in porous rocks Geophysics, vol. 41, No. 4, 1976, pp. 621-645.

Trampert et al *SH* propagator matrix and *Q*, estimates from borehole- and surface-recorded earthquake data Geophys. J. Int., vol. 112, 1993, pp. 290-299.

van Houten et al An overlapping subzone technique for MR-based elastic property reconstruction Magnetic Resonance in Medicine, vol. 42, 1999, pp. 779-786.

* cited by examiner

METHOD FOR RETRIEVING LOCAL NEAR-SURFACE MATERIAL INFORMATION

FIELD OF THE INVENTION

The present invention relates to a method for retrieving information about near-surface material in the locality of a group of receivers.

BACKGROUND OF THE INVENTION

Most observations of seismic waves are made either at or very near to the Earth's surface. However, the elastic properties of the Earth close to the measurement surface show some variability. This variability is due to various changes in the petrophysical properties of the Earth and, among them, permeability changes, presence of fractures, presence of fluids in pores, or compaction, diagenesis or metamorphism changes (Toksöz, M. N., Cheng, C. H., and Timur, A., 1976, *Velocities of seismic waves in porous rocks: Geophysics,* 41, 621–645). It often results in data perturbations of at least a similar magnitude to the target signal.

Thus, before reliable subsurface information can be retrieved from seismic recordings at or very near to the earth's surface, corrections for these effects are required.

Also, it has been shown that variations in near-receiver elastic properties cause the following complications. Firstly, receiver static variations in the data are receiver-to-receiver traveltime anomalies due to the propagation of most of the seismic energy through the heterogeneous shallow structure. Secondly, lateral variations in free-surface reflectivity cause both differences in the amount of reflected and converted energy, and focussing or defocusing of seismic energy. These effects result in amplitude perturbations, especially on horizontal recordings (Kähler, S., and Meissner, R., 1983, *Radiation and receiver pattern of shear and compressional waves as a function of Poisson ratio: Geophys. Prosp.,* 31, 421–435).

Decomposing the recorded wavefields into upgoing and downgoing P and S waves allows an analysis of said recorded wavefields without the effects of any free-surface interaction (Dankbaar, J. W. M., 1985, *Separation of P- and S-waves: Geophys. Prosp.,* 33, 970–986).

However, to perform wavefield decomposition, the free-surface, reflectivity and, hence, local sub-receiver properties, need to be known.

PRIOR ART

In medical imaging, several concepts to estimate local material properties have been developed. In fact, medical practitioners aim to estimate local material properties since quantization of mechanical properties of tissue could improve early detection of pathology (Gao, L., Parker, K. J., Lerner, R. M., and Levinson, S. F., 1996, *Imaging of the elastic properties of tissue—a review: Ultrasound in medicine & biology,* 22, 959–977). Unlike in conventional seismic surveys, the displacement field is measured throughout a tissue using ultrasound or magnetic resonance imaging (MRI) based measurement techniques (Muthupillai, R., Lomas, D. J., Rossman, P. J., Greenleaf, J. F., Manduca, A., and Ehman, R. L., 1995, *Magnetic resonance elastography by direct visualization of propagating acoustic strain waves: Science,* 269, 1854–1857). Quantitative elasticity reconstruction is achieved either by comparing modelled stress to measured strain (Gao et al., 1996, previously cited; Van Houten., E. E. W., Paulsen, K. D., Miga, M. I., Kennedy, F. E., and Weaver, J. B., 1999, *An overlapping subzone technique for MR-based elastic property reconstruction: Magnetic resonance in medicine,* 42, 779–786) or by direct inversion of the observed displacement field. For example, it has been shown that elastic properties can be estimated by localized inversion of the equation of motion (Romano, A. J., Shirron, J. J., and Bucaro, J. A., 1998, *On the non-invasive determination of material parameters from a knowledge of elastic displacements: theory and numerical simulation: IEEE Transactions on Ultrasonics, Ferroelectrics, and Frequency Control,* 45, 751–759; Oliphant, T., Mahowald, J. L., Ehman, R. L., and Greenleaf, J. F., 1999, *Complex-valued quantitative stiffness estimation using dynamic displacement measurements and local inversion of conservation of momentum: IEEE Ultrasonics Symposium,* pages 1641–1644; Oliphant, T. E., Manduca, A., Ehman, R. L., and Greenleaf, J. F., 2001, *Complex-valued stiffness reconstruction for magnetic resonance elastography by algebraic inversion of the differential equation: Magn. Reson. Med.,* 45, 299–310).

Since conventional seismic data are acquired only at the surface, the problem to determine seismic subsurface properties is ill-posed.

A method for estimating near-surface material properties from seismic data has been proposed. According to this method, the wave field is recorded using a dense 3-D receiver group to allow the computation of temporal and spatial wavefield derivatives using finite-difference operators. The dense 3-D receiver group permits to better constrain seismic near-surface velocities (Curtis, A., and Robertsson, J. O. A., 2002, *Volumetric wavefield recording and wave equation inversion for near-surface material properties: Geophysics,* 67, 1602–1611). The receiver group geometry consists of a single buried three-component geophone and several surface geophones. The surface geophones are sufficiently close that spatial wavefield derivatives can be computed, which is required to invert the equation of motion for local material parameters. Such geometry, which accomplishes P/S separation, has been originally introduced by Robertsson and Muyzert (Robertsson, J. O. A., and Muyzert, E., 1999, *Wavefield separation using a volume distribution of three component recordings: Geophys. Res. Lett.,* 26, 2821–2824).

The material properties are constrained by algebraic inversion of the wave equation (Oliphant et al., 1999, Oliphant et al, 2001, and Curtis and Robertsson, 2002, previously cited). Denoting the recorded particle velocity v by $[u_1 \ u_2 \ u_3]^T$, the wave equation, in a homogeneous and isotropic medium, reads:

$$\frac{\partial v}{\partial t^2} = \alpha^2 \nabla (\nabla \cdot v) - \beta^2 \nabla \times (\nabla \times v), \qquad (1)$$

where $\alpha$ is the P-wave velocity, $\beta$ is the S-wave velocity. Boundary conditions state that the traction $\sigma_{i3}$ vanishes at the free surface, except for the air wave. Using the constitutive equation for a homogeneous elastic medium, this allows a substitution of first-order depth derivatives by expressions with horizontal derivatives:

$$\partial_3 v_1 = -\partial_1 v_3, \qquad (2a)$$

$$\partial_3 v_2 = -\partial_2 v_3, \qquad (2b)$$

-continued $$\partial_3 v_3 = -\left(\frac{\alpha^2 - 2\beta^2}{\alpha^2}\right)(\partial_1 v_1 + \partial_2 v_2). \quad (2c)$$

It has been shown that the following system of equations is obtained after substitution of the free surface derivative conditions into the wave equation (Curtis and Robertsson, 2002, previously cited):

$$\partial_{tt} v_1 = \beta^2 A_1(t) - \frac{\beta^4}{\alpha^2} B_1(t), \quad (3a)$$

$$\partial_{tt} v_2 = \beta^2 A_2(t) - \frac{\beta^4}{\alpha^2} B_2(t), \quad (3b)$$

$$\partial_{tt} v_3 = \alpha^2 A_3(t) - \beta^2 B_3(t). \quad (3c)$$

The expressions for the measurable coefficients $A_i$ and $B_i$ of equations (3a), (3b) and (3c) for direct wave equation inversion are obtained by substitution of the free surface derivative conditions, equations (2), into the wave equation (1):

$$A_1(t) = \frac{2}{\Delta z}(\partial_1 v_3 + \partial_3' v_1) + \nabla_H^2 v_1 + 2\partial_1(\nabla_H \cdot v_H), \quad (29)$$

$$A_2(t) = \frac{2}{\Delta z}(\partial_2 v_3 + \partial_3' v_2) + \nabla_H^2 v_2 + 2\partial_2(\nabla_H \cdot v_H), \quad (30)$$

$$A_3(t) = \frac{2}{\Delta z}(\nabla_H \cdot v_H + \partial_3' v_3) - \nabla_H^2 v_3, \quad (31)$$

$$B_1(t) = 2\partial_1(\nabla_H \cdot v_H), \quad (32)$$

$$B_2(t) = 2\partial_2(\nabla_H \cdot v_H) \quad (33)$$

and $$B_3(t) = \frac{4}{\Delta z}(\nabla_H \cdot v_H) - 2(\nabla_H^2 v_3) \quad (34)$$

The finite-difference (FD) first-order derivatives in depth are denoted $\partial_3' v$ and are given by:

$$\partial_3' v(\Delta z/2) = \frac{v(\Delta z) - v(0)}{\Delta z} + O(\Delta z^2), \quad (35)$$

wherein $\Delta z$ is the depth beneath the free surface of the buried geophone. The vertical derivative can not be measured exactly at the free surface but at depth $\Delta z/2$. The second depth derivative $\partial_{33} v$ is given by:

$$\partial_{33} v(\Delta z/4) = \frac{\partial_3' v(\Delta z/2) - \partial_3 v(0)}{\Delta z/2} + O(\Delta z^2/4). \quad (36)$$

The vertical derivative at the free surface is obtained by substitution of the free surface conditions. If $\Delta z$ is small, it is possible to assume that $\partial_{33} v(\Delta z/4) \approx \partial_{33} v(0)$.

The following notation is used for horizontal wavefield derivatives:

$$\nabla_H = [\partial_1 \; \partial_2]^T \quad (37)$$

and $$v_H = [v_1 \; v_2]^T. \quad (38)$$

Figure 1:
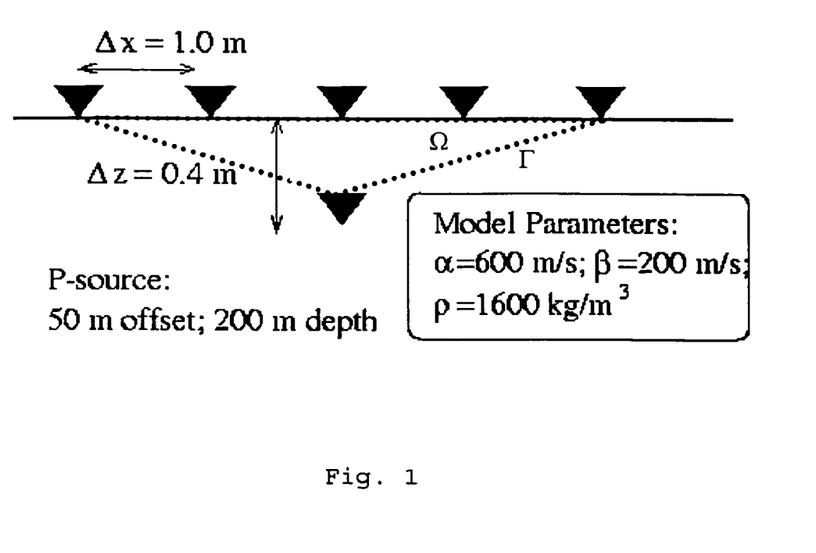
FIG. 1 shows a model and geophone configuration for direct wave equation inversion according to the state of the art. In this figure, the dotted lines outline a volume referred to previously in the present description of the invention.

Direct wave equation inversion has been evaluated with a synthetic example using the model and the dense 2-D geophone group shown in FIG. 1. Since the wavelength depends on the material properties, some prior knowledge has to be available to design the inter-geophone spacing. In the example, the P-wave velocity, $\alpha$, is equal to 600 m/s, the S-wave velocity, $\beta$, is equal to 200 m/s and the density, p, is equal to 1600 kg/m$^3$. A line source, perpendicular to the 2-D plane, located at 200 m depth, emits a 60 Hz Ricker wavelet. The geophones are located at 50 m offset. The spacing between the surface geophones is 1 meter to allow computation of spatial wavefield derivatives. This corresponds to, approximately, ⅙ of the effective wavelength. The depth beneath the free surface of the buried geophone is $\Delta z=0.4$ m.

Figure 2:
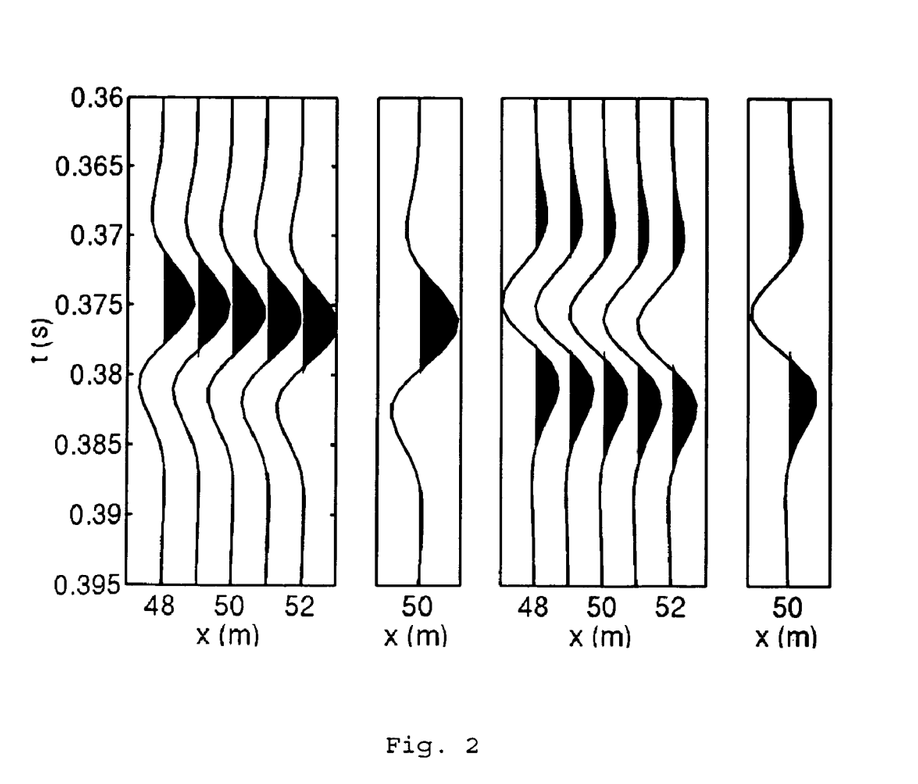
FIG. 2 shows synthetic traces of the particle velocity, recorded by the geophone configuration shown in FIG. 1. In this figure, traces corresponding to the horizontal components are on the left and traces corresponding to the vertical components are on the right.

The recorded traces are shown in FIG. 2. In this Figure, the left graphs display recordings on the horizontal component and the right graphs display recordings on the vertical component, for both: the surface geophones and the buried receiver.

Figure 3A:
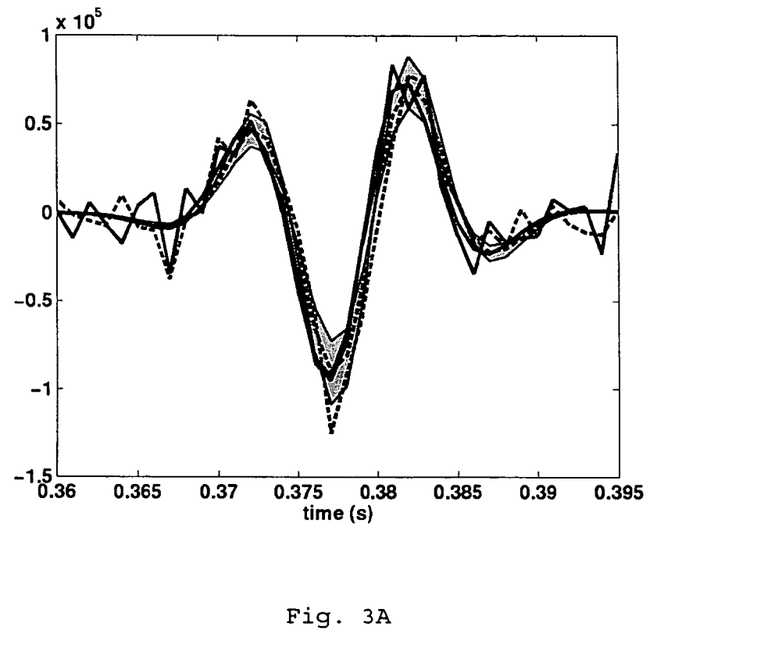
FIGS. 3A and 3B illustrate the sensitivity analysis of wave equation inversion according to the state of the art.
Figure 3B:
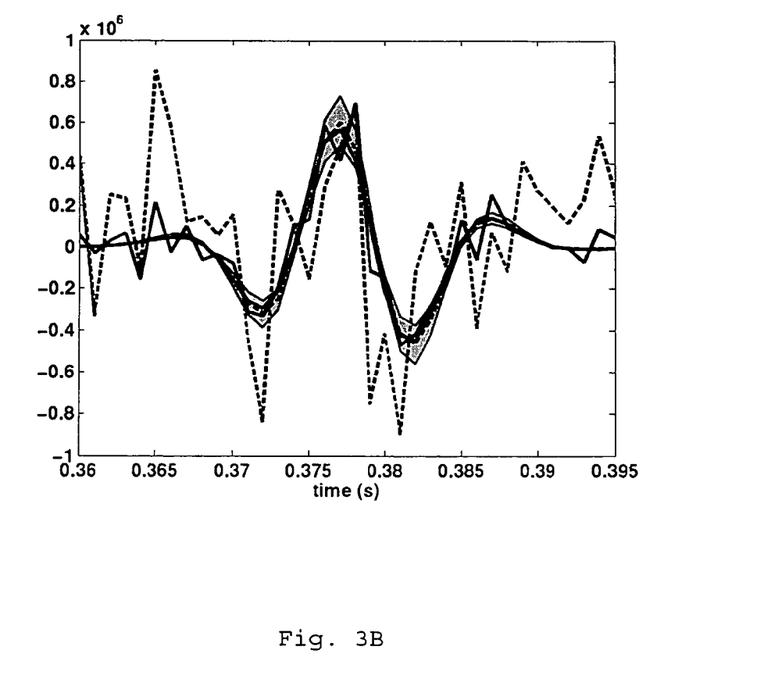

FIGS. 3A and 3B illustrate a problem arising when trying to make practical use of the constraints offered by equations (3a) and (3c). FIG. 3A shows the sensitivity of equation (3a) to variations in $\beta$. FIG. 3B shows the sensitivity of equation (3c) to variations in $\alpha$. In both figures, the dashed and solid curves illustrate the left-hand side and right-hand side of equations (3) using the model velocities for data perturbed by 36 dB Gaussian noise. The grey areas indicate the uncertainty interval for ±10% variations in $\beta$ (FIG. 3A) and ±10% in $\alpha$ (FIG. 3B), and compare this to the effect of noise. It appears that derivative operators are relatively sensitive to effects of noise. Even a small amount of noise causes errors of at least a similar magnitude as 10% variations in velocities.

Thus, if the attractiveness of the above method is that it can deal with the complete wavefield, it requires, on the other hand, the computation of higher order derivatives, which are affected by noise (Muijs, R., Holliger, K., and Robertsson, J. O. A., 2002, *Perturbation analysis of an explicit wavefield separation scheme for P- and S-waves: Geophysics*, 67, 1972–1982). Also, errors such as misorientation and mislocations of individual geophones significantly affect estimates of spatial wavefield derivatives.

It has been proposed to avoid the computation of the derivatives by substituting a plane wave into the wave equation (Muijs, R., Robertsson, J. O. A., Curtis, A., and Holliger, K., 2003, *Near-surface seismic properties for elastic wavefield decomposition: Estimates based on multi-component land and seabed recordings: submitted to Geophysics*). However, this assumes that the first break can be isolated in the recordings.

It has also been proposed to avoid the computation of spatial wavefield derivatives by transforming the wave equation (1) into an integral equation (Romano et al., 1998, previously cited; Romano, A., Bucaro, J. A., Ehman, R. L., and Shirron, J. J., 2000, *Evaluation of a material parameter extraction algorithm using MRI-based displacement measurements: IEEE Transactions on Ultrasonics, Ferroelectrics and Frequency Control*, 47, 1575–1581). However, the volume integrals of this method need to be evaluated and this requires interpolation of the recorded particle velocity v throughout a volume Ω bounded by a surface Γ as shown for example by the dotted line in FIG. 1, and the inventors of the present patent application did not succeed, at the priority date of said patent application, to perform such interpolation in a sufficient accurate manner using a buried geophone.

In addition, it is known from the state of the art that it is possible to estimate the SH-velocity structure and the quality factor in a borehole by analysing an SH propagator matrix in the time domain. The SH propagator matrix is obtained from the spectral ratio of a downhole record over a surface record. (Trampert, J., Cara, M., and Frogneux, M., 1993, *SH propagator matrix and $Q_s$ estimates from borehole- and surface-recorded earthquake data: Geophys. J. Internat.*, 112, 290–299). This approach is only valid for SH waves because such wave types do not undergo conversion at the free surface. In order to estimate SV and the P velocity it is necessary to consider different wave types, for example P-SV or surface waves.

This method cannot be generalized to the anelastic P-SV case, since the problem of constructing the propagator then becomes underdetermined. Cho and Spencer (Cho, W. H. and Spencer, T. W., 1992, *Estimation of polarization and slowness in mixed wavefields: Geophysics*, 805–814) proposed to use a vertical array of geophones to construct an average anelastic P-SV propagator. Assumed is that the recorded wavefield can be described as a superposition of plane waves. The number of geophones required to construct the anelastic P-SV propagator depends on this number of plane waves. For example, at least six geophones are required to estimate the P-SV propagator for an upgoing P-wave interacting with the free surface, i.e. the free surface incident P-wave is reflected and converted at the free surface. Since this method constructs an averaged propagator using an array of geophones, the interpretation is not clear if the medium parameters rapidly change with depth, which is very common close to the free surface. Therefore, this approach is not suitable to determine local near-surface material parameters.

SUMMARY OF THE INVENTION

Considering the above, one problem that the invention is proposing to solve is to carry out an improved method for retrieving local near-surface material information which avoids the computation of wavefield derivatives so that it is less sensitive to measurement errors.

The proposed solution to the above problem is, according to the invention, a method for retrieving local near-surface material information comprising the steps of:—providing a group of receivers comprising at least one buried receiver and at least one surface receiver positioned either at or very near the Earth surface;—recording a seismic wavefield;—estimating a propagator from said recorded seismic wavefield;—inverting said propagator; and—retrieving said near-surface material information.

The buried receiver is preferable close to the surface within a depth of 10 meters or less, preferably 5 meters or less. Alternatively, the information provided by the buried receiver can be obtained from receivers in a borehole at greater depth, for example from a vertical seismic profiling (VSP) measurement.

The method of the invention is applicable to the whole seismogram. It is based on estimation and inversion of wavefield extrapolation filters. This avoids the computation of wavefield derivatives and, therefore, the method of the invention is less sensitive to measurement errors. This is confirmed by noise tests.

In some particular modes for carrying out the method of the invention, the inversion of the P-SV propagator for material properties is carried out in the frequency domain rather than the time domain; the inversion for material properties is carried out for the surface wave component of the seismic signal; the propagator used is for an anisotropic medium, specifically a transversely isotropic medium.

DRAWINGS

The invention will be better understood in the light of the following description of non-limiting and illustrative embodiments, given with reference to the accompanying drawings, in which.

It should be noted that although the illustrations referred to above convey 2D receiver groups and wavefields, the invention applies equally to 3D receiver groups and wavefield.

MODE(S) FOR CARRYING OUT THE INVENTION

The method of the invention permits to retrieve local near-surface material information.

For the implementation of the invention, a group of receivers is provided. This group of receivers comprises at least one surface receiver placed at or very near the Earth surface. It also comprises at least one buried receiver placed at a depth $\Delta z$ under the Earth surface. The group of receivers may advantageously comprise a plurality of surface receivers and, possibly, a plurality of buried receivers. If the group of receivers comprises only one surface receiver and only one buried receiver, then the surface receiver is positioned approximately right above the buried geophone. If the group of receivers comprises a plurality of surface receivers, these receivers may be placed at regular distances one from each other that permit wavefield interpolation between the receivers in order to reconstruct the wavefield directly above the buried receiver. As a minimum, the receivers are not spaced further apart than half of the horizontal wavelength corresponding to the Nyquist frequency in the data. Also, as it will appear below from the description of the invention, there is no requirement on the depth of the buried receiver.

The receivers of the invention are, for example, geophones. It may be single component geophones or multi-component geophones, in particular, three-component geophones. In the case where the near surface is fluid saturated, geophones could be replaced by hydrophones.

The method of the invention is based on propagator estimation and inversion. It is advantageously used for a seismic wavefield comprising P and S waves, the propagator being then a coupled P-SV propagator. However, the propagator may be calculated for the whole seismogram and various temporal sections of the propagator representing different wave types may be inverted separately.

Propagator Estimation

According to a mode for carrying out the invention, an elastic P-SV propagator is estimated and a scheme to constrain near-surface P and S velocities based on waveform inversion of this P-SV propagator is illustrated.

In the following description, $v_x$ denotes the inline direction, $v_y$ the crossline direction and $v_z$ the vertical direction.

Assuming that the recorded wavefield can be written as a superposition of plane waves, the recorded wavefield at depth $\Delta z$ can be written in the form $$v(t, x, \Delta z) = P(t, x) * v(t, x, 0), \quad (7)$$

where $$P = \begin{pmatrix} P_{11} & P_{12} & P_{13} \\ P_{21} & P_{22} & P_{23} \\ P_{31} & P_{32} & P_{33} \end{pmatrix}. \quad (8)$$

Boundary conditions state that the traction vanishes at the free surface ($z=0$) and hence does not contribute to the downward extrapolation of the wavefield.

For a homogeneous, isotropic and elastic medium between the free surface and depth $\Delta z$, the propagator $P$ is a function of the P-wave velocity $\alpha$, the S-wave velocity $\beta$ and the horizontal slowness p. For a free-surface incident plane wave with horizontal slowness p, the analytical propagator coefficients read (Aki, K., and Richards, P. G., 2002, *Quantitative seismology;* 2nd. Ed.: University Science Books):

$$\hat{P}_{11}(t,p) = \beta^2 p^2 G_1^P(t,p) + [(1-2\beta^2 p^2)/2] G_1^S(t,p), \quad (9)$$

$$\hat{P}_{22}(t,p) = G_1^S(t,p), \quad (10)$$

$$\hat{P}_{33}(t,p) = [(1-2\beta^2 p^2)/2] G_1^P(t,p) + \beta^2 p^2 G_1^S(t,p), \quad (11)$$

$$\hat{P}_{13}(t,p) = [-p(1-2\beta^2 p^2)/(2q_P)] G_2^P(t,p) + \beta^2 p q_S G_2^S(t,p), \quad (12)$$

$$\hat{P}_{31}(t,p) = -\beta^2 p q_P G_2^P(t,p) + [p(1-2\beta^2 p^2)/(2q_S)] G_2^S(t,p), \quad (13)$$

$$\hat{P}_{12}(t,p) = \hat{P}_{21}(t,p) = \hat{P}_{23}(t,p) = \hat{P}_{32}(t,p) = 0, \quad (14)$$

where $$G_1^P(t,p) = [\delta(t+q_P \Delta z) + \delta(t-q_P \Delta z)], \quad (15a)$$

$$G_2^P(t,p) = [\delta(t+q_P \Delta z) - \delta(t-q_P \Delta z)], \quad (15b)$$

$$G_1^S(t,p) = [\delta(t+q_S \Delta z) + \delta(t-q_S \Delta z)], \quad (15c)$$

$$G_2^S(t,p) = [\delta(t+q_S \Delta z) - \delta(t-q_S \Delta z)], \quad (15d)$$

These functions contain the phase shifts for two-way extrapolation of the wavefield towards depth $\Delta z$. The vertical slownesses $q_P$ and $q_S$ are given by:

$$q_P = (\alpha^{-2} - p^2)^{1/2}, \quad (16a)$$

$$q_S = (\beta^{-2} - p^2)^{1/2}, \quad (16b)$$

The coefficients of the propagator matrix [equations (9)–(14)] can be interpreted as follows. The amplitudes of the propagator coefficients are wavefield decomposition filters: before extrapolation of the recordings to depth Lz, the wavefield is decomposed into upgoing and downgoing P, SV and SH waves. The phase shifts describe the two-way wavefield propagation to depth $\Delta z$. Finally, summation of the extrapolated decomposed wavefield renders the total wavefield at depth $\Delta z$ (Osen, A., Amundsen, L., and Reitan, A., 1999, *Removal of water-layer multiples from multicomponent sea-bottom data: Geophysics*, 64, 838–851; Aki and al., 2002, previously cited).

The extrapolation filters for elastic P-SV wave propagation can be obtained directly from the data exploiting symmetry properties of the filters: the analytical expressions for the extrapolation filters show that $P_{11}$, $P_{22}$ and $P_{33}$ are even function around $t=0$ and $P_{13}$ and $P_{31}$ are odd functions. Hence, the spectra of $P_{11}$, $P_{22}$ and $P_{33}$ are entirely real, whereas the spectra of $P_{13}$ and $P_{31}$ are purely imaginary. These properties are used to estimate the extrapolation filters without prior information on $\alpha$, $\beta$ and p. Equating real and imaginary parts of equation (7) in the frequency domain shows that the propagator coefficients are given by:

$$P_{11}(\omega, x) = \Re\left[\frac{v_x(\omega, x, \Delta z)}{v_x(\omega, x, 0)}\right] + \Im\left[\frac{v_z(\omega, x, 0)}{v_x(\omega, x, 0)}\right] \Im[P_{13}(\omega, x)] \quad (17)$$

$$P_{22}(\omega, x) = \Re\left[\frac{v_y(\omega, x, \Delta z)}{v_y(\omega, x, 0)}\right] \quad (18)$$

$$P_{33}(\omega, x) = \Re\left[\frac{v_z(\omega, x, \Delta z)}{v_z(\omega, x, 0)}\right] + \Im\left[\frac{v_x(\omega, x, 0)}{v_z(\omega, x, 0)}\right] \Im[P_{31}(\omega, x)], \quad (19)$$

$$P_{13}(\omega, x) = i \Im\left[\frac{v_x(\omega, x, \Delta z)}{v_x(\omega, x, 0)}\right] \left\{\Re\left[\frac{v_z(\omega, x, 0)}{v_x(\omega, x, 0)}\right]\right\}^{-1}, \quad (20)$$

$$P_{31}(\omega, x) = i \Im\left[\frac{v_z(\omega, x, \Delta z)}{v_z(\omega, x, 0)}\right] \left\{\Re\left[\frac{v_x(\omega, x, 0)}{v_z(\omega, x, 0)}\right]\right\}^{-1}. \quad (21)$$

In these equations, $\Re[v(\omega,x,z)]$ denotes the real part of $v(\omega,x,z)$ and $\Im[v(\omega,x,z)]$ is the imaginary part of $v(\omega,x,z)$.

Note that these data-estimated propagator filters do not require an assumption that only one single slowness event exists in the data. Expressions for P(x,t) are found by calculating the inverse Fourier transform of equations (17) to (21).

The propagator terms $P_{11}$, $P_{22}$ and $P_{33}$ have the greatest amplitudes and, especially, for waves with near-vertical incidence, the off-diagonal terms $P_{13}$ and $P_{31}$ of the propagator are insignificant as compared to $P_{11}$, $P_{22}$ and $P_{33}$ which are mainly used to constrain the P and S waves velocities. Then, approximations are possible to obtain $P_{11}$ and $P_{33}$. $P_{11}$ can be approximated using only the horizontal components $v_x$, both at the surface and at depth. $P_{33}$ can be approximated using only the vertical components. As a result, a group of receivers comprising only one single-component surface geophone and only one single-component buried geophone placed right below the surface geophone may be used for the implementation of the invention. The phase information is not changed by the approximations made. However, the amplitude information is distorted to some extent.

Spectral divisions in equations (17) to (21) are numerically unstable because signals are band-limited and due to the existence of notches in the spectrum. The following procedure is used to stabilize said spectral divisions. For arbitrary signals $F(\omega)$ and $S(\omega)$, the spectral division of $F(\omega)$ by $S(\omega)$ is given by:

$$G(\omega) = \frac{F(\omega)}{S(\omega)}. \tag{22}$$

In practice, the spectral ratio is estimated using the following technique (Langston, C. A., 1979, *Structure under Mount Rainier, Washington, inferred from teleseismic body waves*: J. Geophys. Res., 84, 4749–4762):

$$G'(\omega) = \frac{F(\omega)S^*(\omega)}{\Phi_{ss}(\omega)} W(\omega), \tag{23}$$

where $$\Phi_{ss} = \max\{S(\omega)S^*(\omega), c\max[S(\omega)S^*(\omega)]\} \tag{24}$$

and $W(\omega)$ is a frequency window to limit the final frequency band in the estimated deconvolution. The complex conjugate of S is denoted by S*. The function $\Phi_{ss}$ can be thought of as simply being the autocorrelation of $S(\omega)$ with any spectral troughs filled to a level depending on the parameter c. The frequency windowing function $W(\omega)$ is a tapered window with cut-off frequencies the minimum and maximum frequency for which $$S(\omega)S^*(\omega) > c\max[S(\omega)S^*(\omega)]. \tag{25}$$

This criterion implies that the parameter c also controls the bandwidth of the spectral ratio $G'(\omega)$.

Propagator Inversion

Figure 4:
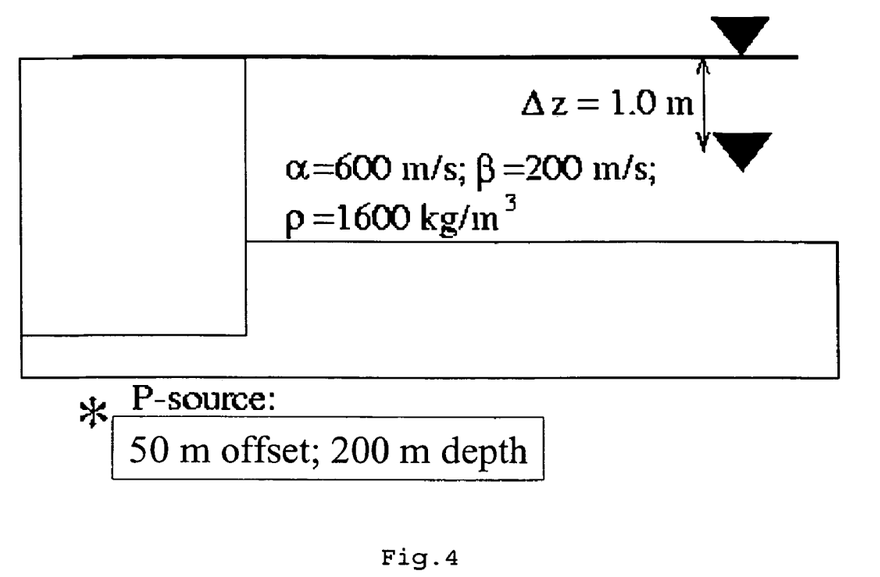
FIG. 4 shows a geophone configuration and parameters of a half-space model according to the invention.
Figure 5:
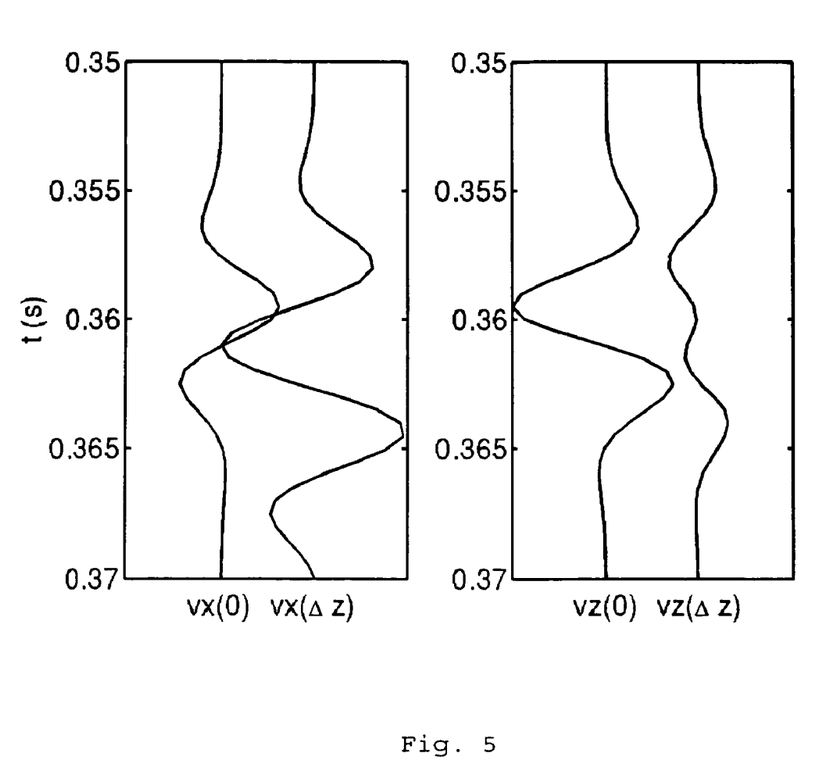
FIG. 5 shows synthetic traces of the particle velocity recorded by the surface and buried geophone shown in FIG. 4. In this figure, traces corresponding to the horizontal components are on the left and traces corresponding to the vertical components are on the right.

The inversion scheme may be illustrated for near-surface velocities with a half-space example. In FIG. 4, The P velocity is 600 m/s, the S velocity is 200 m/s, and the density is 1600 kg/m³. An explosive line source is located at 200 m depth and emits a 120 Hz Ricker wavelet. Multi-component geophones are positioned at 50 m offset, one is located at the free surface and the second geophone is located at 1.0 m depth. Synthetic data are computed using the Cagniard-de Hoop method (de Hoop, A. T., and van der Hijden, J. H. M. T., 1983, *Generation of acoustic waves by an impulsive line source in a fluid/solid configuration with a plane boundary*: J. Acoust. Soc. Am., 74, 333–342). FIG. 5 shows synthetic traces of the particle velocity recorded by the surface and buried geophones shown in FIG. 4. The left graph shows traces of $v_x$ and the right graph shows traces of $v_z$.

Figure 6:
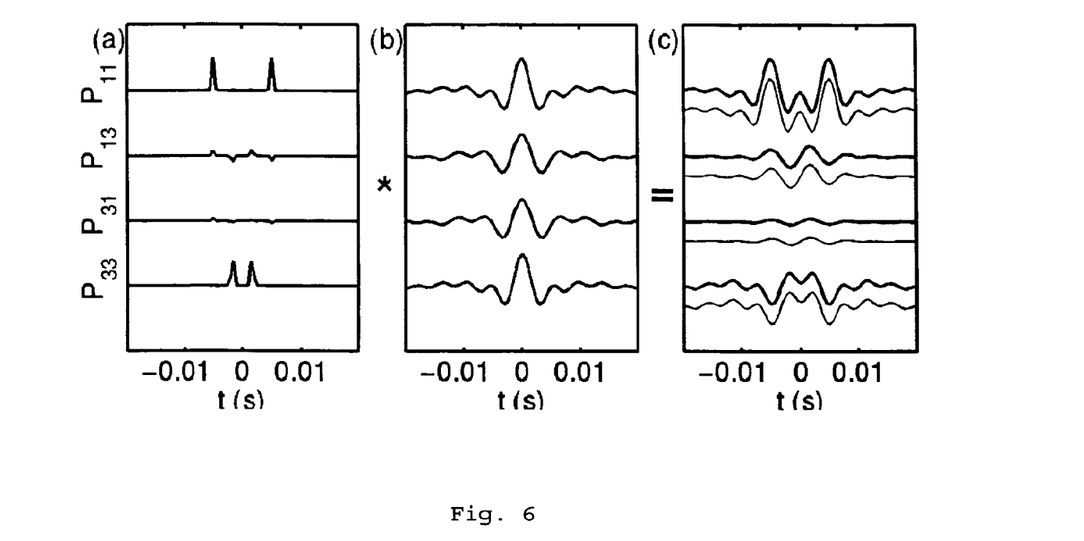
FIG. 6 illustrates the fitting procedure for the data displayed in FIG. 5.

Both the propagators $P_{11}$, $P_{13}$, $P_{31}$, and $P_{33}$ calculated from the data displayed in FIG. 5 and the fitting procedure to estimate $\alpha$, $\beta$ and p are outlined in FIG. 6.

Analytical solutions for propagator filters are functions of $\alpha$, $\beta$ and p. Given estimates for $\alpha$, $\beta$ and p, such analytical solutions can be computed as shown on the right graph (a) of this Figure. In practice, data is band-limited, and these analytical solutions can not be compared directly to the estimated filters. So, the frequency band of these analytical expressions is limited to a similar frequency band as the data-estimated propagator filters. Graph (b) shows the time-domain expressions of frequency filters $W(\omega)$ [equation (23)], which limit the solution to the frequency band in which the spectral division was performed. A convolution of the analytical solution in graph (a) with the filter shown in graph (b) allows a comparison to the data-estimated propagator. Graph (c) illustrates the fit between the data-estimated and band-limited analytical propagator filters. It shows that there is a good agreement-between the analytical (thin lines) and data-estimated propagator filters (thick lines). The stabilization factor c=0.05.

FIG. 6 shows that both the phase and the full waveform of the extrapolation filters can be used to constrain near-surface properties. For example, the time delay between the peaks in $P_{11}$ and $P_{33}$ gives the two-way vertical traveltime for SV and P waves, respectively. The waveforms contain both phase and amplitude information. The amplitudes of the propagator filters are controlled by the free-surface reflectivity. To illustrate the constraints of propagator waveform fitting on $\alpha$, $\beta$ and p, the following objective function is defined:

$$E = E_{11} + E_{33} + E_{13} + E_{31}, \tag{26}$$

with $$E_{ij} = \left\{ \sum_{t=t_1}^{t_2} \left[ P_{ij}(t) - \hat{P}_{ij}(t, \alpha, \beta, p) \right]^2 \right\}^{1/2}. \tag{27}$$

The analytical solution for the propagator filter component ij is denoted by $\hat{P}_{ij}(t,\alpha,\beta,p)$, the data-estimated propagator filter component ij is denoted $P_{ij}(t)$. Note that different components within the sum on the right hand side of equation (26) could be weighted differently to account for relative uncertainty or any other effect, if desired.

Figure 7:
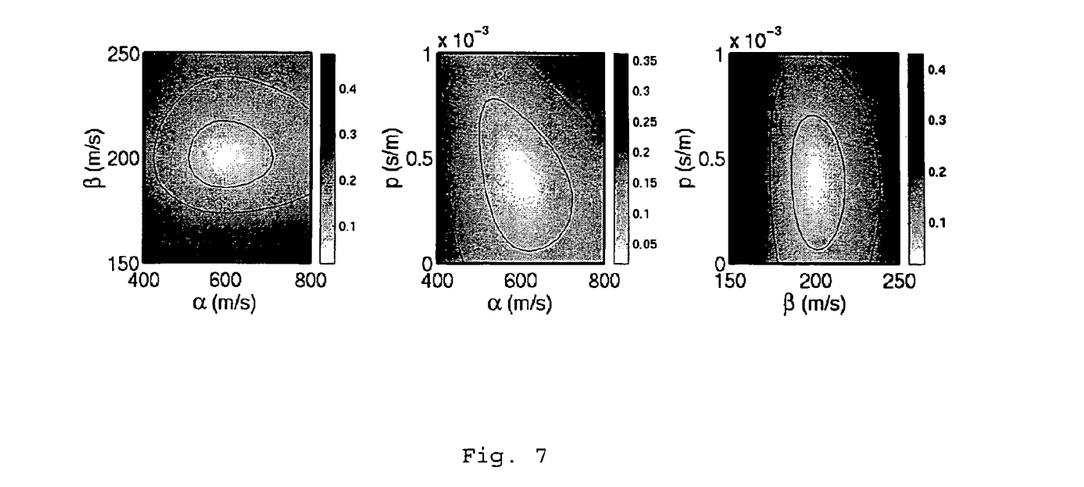
FIG. 7 are cross sections intersecting the minimum of the objective function E.

Cross sections intersecting the minimum of the objective function E are shown in FIG. 7. Contours are drawn for E=0.10 and E=0.20. These show that perturbations in p have a relatively small influence on estimates of $\alpha$ and $\beta$.

Figure 8:
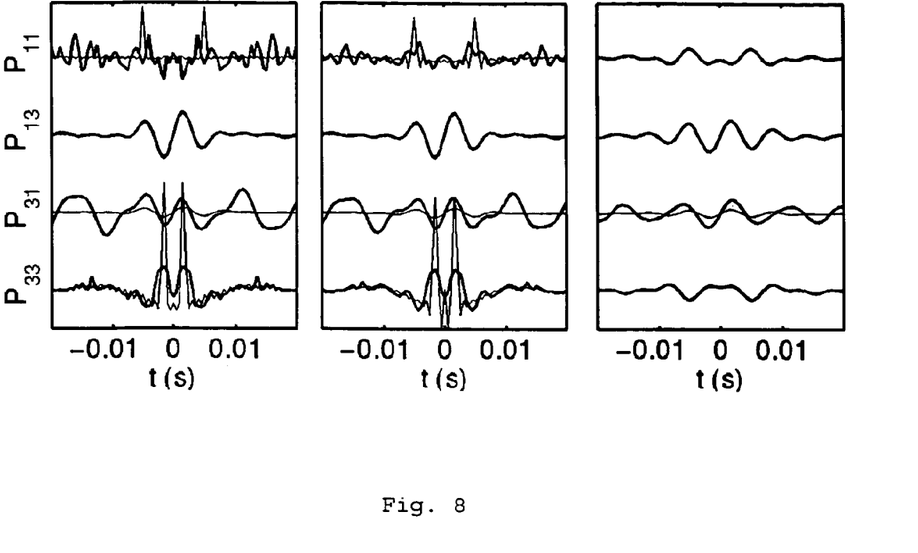
FIG. 8 illustrates the effect of stabilization factor c on noise-perturbed propagator filters.

FIG. 8 illustrates the effect of stabilization factor c on noise-perturbed data-estimated propagator filters for recorded data perturbed by 20 dB Gaussian noise. Data-estimated propagator filters are compared to the analytical filters which are computed for different values of the stabilization factor c [equation (24)], namely c=0.02 (FIG. 8, left graph), c=0.05 (FIG. 8, centre graph) and c=0.20 (right graph). The thin lines are the analytical solutions and the thick lines the data-estimated propagator filters. The amplitudes of each filter are normalized to the solution for c=0.02. For increasing c-value, the effect of noise is reduced in the propagator filters. Note the differences between the different coefficients: for a low c-value, there is an excellent fit between $\hat{P}_{13}$ and $P_{13}$, whereas noise significantly affects $P_{31}$. This is related to the absence of free-surface incident S-waves in this example. A second effect is that the frequency band is limited for a higher c-value. The filters are smoothed and contain less energy. Some care must be taken selecting the stabilization factor c, since the analytical solutions are not corrected for the stabilization of notches in the spectral divisions, which have to be evaluated to obtain $P_{ij}$.

Figure 9:
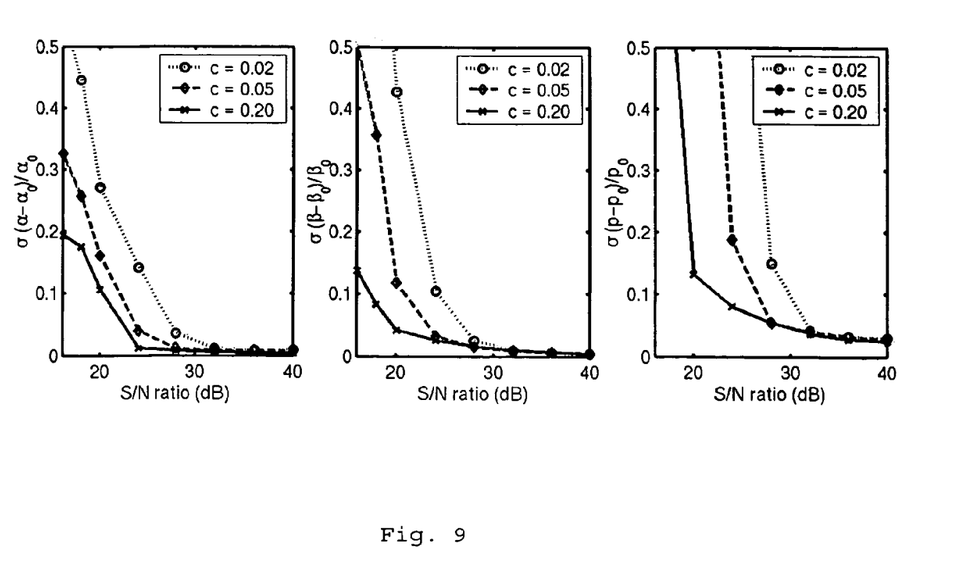
FIG. 9 are uncertainties in estimates for α, β and p for different S/N ratios and c-values.

FIG. 9 shows the uncertainties in estimates of $\alpha$, $\beta$ and p for different S/N ratios and c-values. For example, the relative standard deviation $\sigma$ in $\alpha$ is given by:

$$\frac{\sigma(\alpha - \alpha_0)}{\alpha_0} = \frac{1}{\alpha_0}\left[\frac{\sum_{i=1}^{N}(\alpha_i - \alpha_0)^2}{N-1}\right]^{1/2}, \quad (28)$$

where $\alpha_0$ is the model P-wave velocity and $\alpha_i$ is the estimated P-wave velocities. For each noise level, experiments were conducted 1000 times (N=1000) with different manifestations of Gaussian noise. The minimum of the objective function E was determined using a forward search method. It appears that the estimates of $\alpha$, $\beta$ and p are most robust for c=0.20, and that $\alpha$ and $\beta$ are better constrained than p. Errors in estimates of p do not influence estimates of $\alpha$ and $\beta$ significantly.

In the previous example only a single slowness arrival was recorded. The second experiment is performed in a model with a near-surface low velocity layer. Reverberations in the near-surface low velocity layer result in multiple arrivals. It is important to assess the consequences of multiple arrivals with different slownesses, since a single slowness assumption is required to construct the analytical propagator filters.

Figure 10:
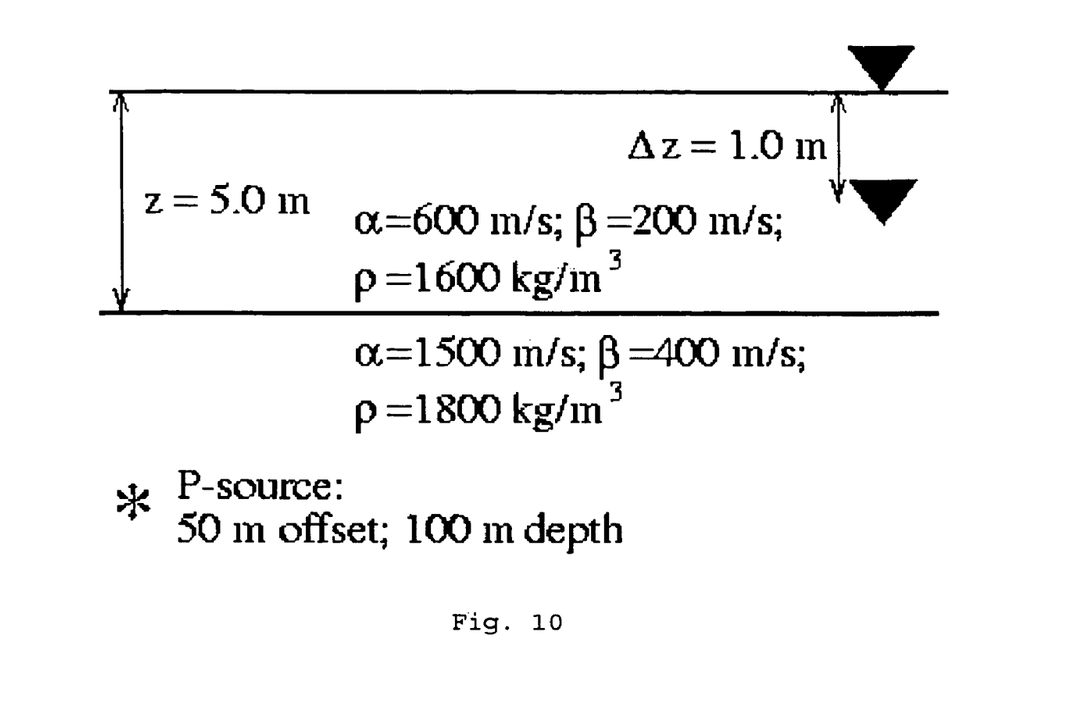
FIG. 10 shows a model and geophone configuration for an experiment with near-surface low velocity layer according to the invention.

FIG. 10 shows a model and geophone configuration for experiment with near-surface low velocity layer. The receiver group is similar to the previous experiment. The near-surface layer is 5 m thick with $\alpha$=600 m/s, $\beta$=200 m/s and $\rho$=1600 kg/m$^3$. The parameters of the underlying half-space are: $\alpha$=1500 m/s, $\beta$=400 m/s and $\rho$=1800 kg/m$^3$. The P-source is located at 100 m depth and emits a 120 Hz Ricker wavelet.

Figure 11:
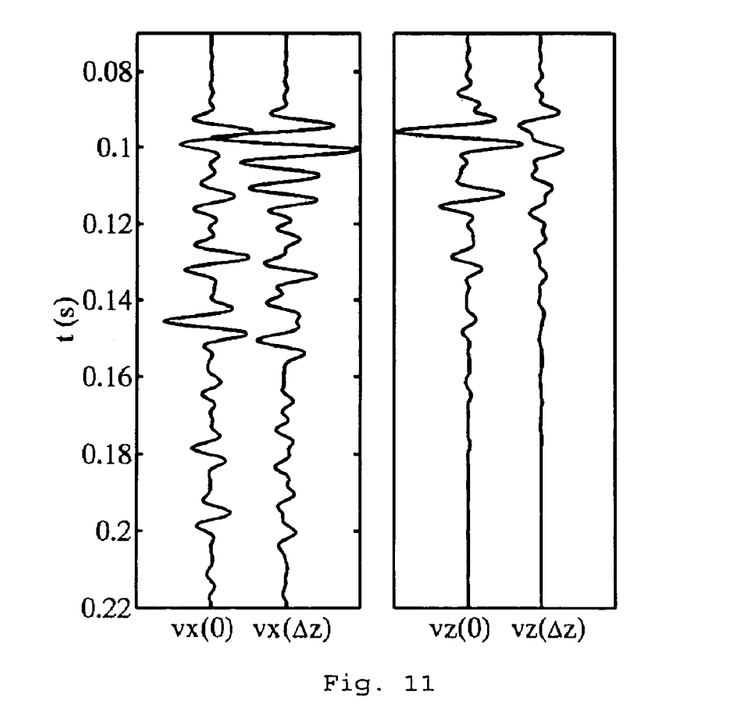
FIG. 11 shows synthetic traces recorded by the geophone configuration displayed in FIG. 10.

The recorded synthetic traces are shown in FIG. 11. Recordings of $v_x$ are shown in the left graph and recordings of $v_z$ are shown in the right graph.

Figure 12:
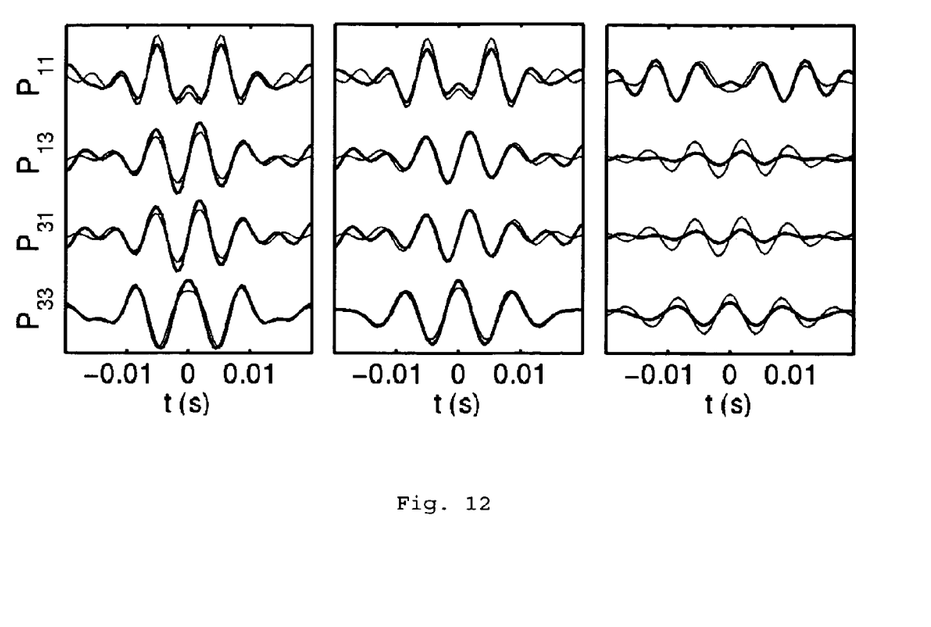
FIG. 12 illustrates the effect of stabilization factor c in deconvolution.

FIG. 12 compares data estimated propagator expressions to analytical propagators. As for FIG. 8, data-estimated propagator filters are compared to the analytical filters which are computed for different values of the stabilization factor c: c=0.02 (FIG. 12, left graph), c=0.05 (FIG. 12, centre graph) and c =0.20 (right graph). The thin lines are the analytical solutions and the thick solid lines are the filters estimated from the data. Traces are normalized with respect to the c=0.02 curves. It appears that, again, both the temporal resolution and the noise level are reduced with increasing c-value. However, the fit between $\hat{P}_{13}$ and $P_{13}$, for example, deteriorates for c>0.05. This is caused by corrections for notches in the spectral divisions, which need to be evaluated to obtain $P_{ij}$. The analytical solutions are not corrected for the stabilization of notches in the spectral divisions. Also, for high c-values, the propagators lack clear maxima introducing several minima in the waveform fitting misfit function E [equation (26)].

Figure 13:
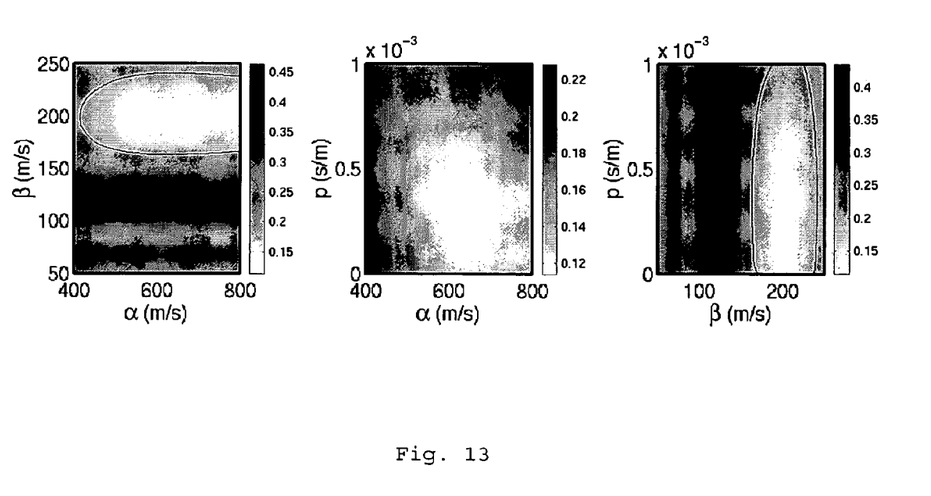
FIG. 13 are cross sections intersecting the minimum of the objective function E.
Figure 14:
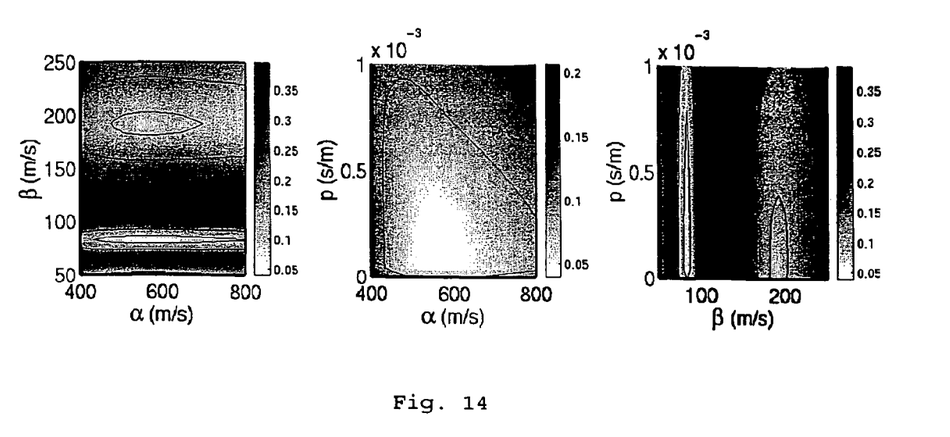
FIG. 14 are cross sections intersecting the minimum of the objective function E.

Cross sections intersecting the minimum of these misfit functions E are shown in FIGS. 13 and 14 for c=0.05 and c=0.20. Contours are drawn for E=0.15, E=0.20 and c=0.05. It appears that, for c=0.05, the minimum is located close to the model velocities, whereas for c=0.20, a low value for $\beta$ is preferred by waveform inversion.

Figure 15:
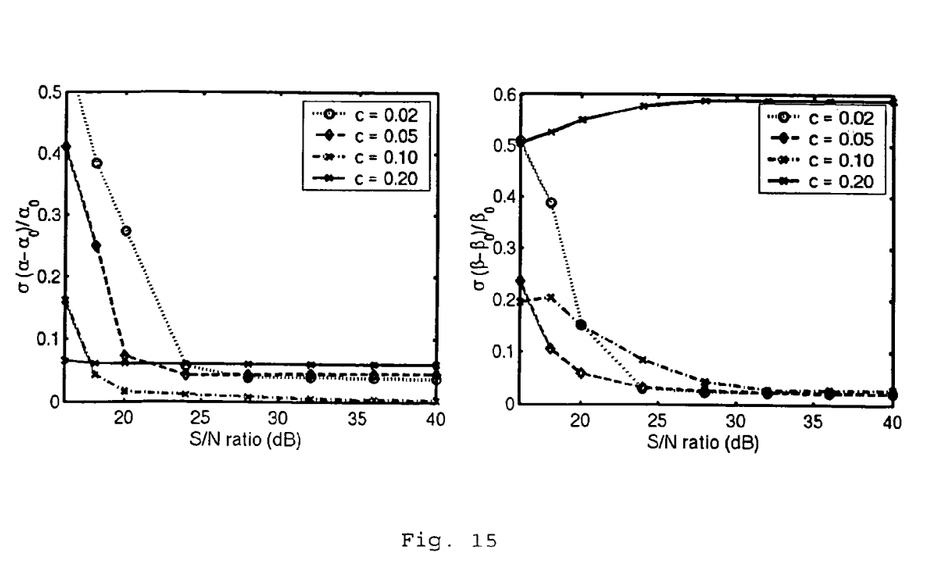
FIG. 15 are uncertainties in estimates for α, β and p for different c-values as a function of S/N ratio.

FIG. 15 shows uncertainty in estimates for $\alpha$ and $\beta$ for different c-values as a function of S/N ratio and illustrates the effect of noise on velocity estimation. It appears that propagator waveform inversion for $\alpha$ and $\beta$ is robust if the c-value is properly selected. For low c-values, for example c=0.02, noise affects the velocity estimates whereas, for high c-values, errors are introduced due to notches in the spectrum and non-unique solutions exist. Multiple arrivals, i.e. the single slowness assumption for propagator waveform fitting, cause only small errors in the velocity estimates.

From the above description, it results that the method of the invention permits to retrieve local near-surface material information without imposing any constraints on the depth of the buried geophone. It avoids the computation of spatial wavefield derivatives and, therefore, it is less sensitive to noise.

The propagator filters are estimated directly from the data. In order to retrieve the near-surface velocities, a single slowness assumption has been made. However, in a medium with a near-surface low-velocity layer, the results are not unduly influenced by multiple arrivals. The synthetic examples show that the inverted P and S wave velocities are not sensitive to variations in the horizontal slowness. Propagator inversion provides robust constraints on local near-surface properties.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

Specifically, the approach could be used on surface wave data rather than P-SV plane waves with a corresponding change in the analytic propagator used in the inversion stage.

The approach could also be used in the transversely isotropic case, again with an appropriate change in the analytic propagator.

The invention claimed is:

1. A method for retrieving local near-surface material information comprising the steps of:
    obtaining seismic wavefield information from a group of receivers comprising at least one buried receiver and at least one surface receiver;
    recording a seismic wavefield;
    estimating a propagator from said recorded seismic wavefield by estimating elements of a propagator matrix using spatially independent components of the recorded wavefield and/or ratios thereof;
    inverting said propagator; and
    retrieving said near-surface material information.

2. The method of claim 1, wherein the group of receivers comprises a plurality of surface receivers.

3. The method of claim 1 wherein the receivers are geophones.

4. The method of claim 1, wherein the buried receiver is a three-component geophone.

5. The method of claim 1, wherein the buried receiver is located at a depth of less than 10 meters.

6. The method of claim 1, wherein the buried receiver is located in a borehole.

7. The method of claim 1, wherein the seismic wavefield comprises P and S waves.

8. The method of claim 1, wherein the propagator is calculated for the whole recorded seismic wavefield.

9. The method of claim 1, wherein the propagator is a coupled P-SV propagator.

10. The method of claim 1, further comprising the step of:
assuming that the recorded seismic wavefield can be written as a superposition of plane waves.

11. The method of claim 1, further comprising the steps of:
defining propagator coefficients, which are wavefield decomposition filters, for the free-surface plane wave; and
extrapolating said coefficients to depth $\Delta z$.

12. The method of claim 1, wherein the propagator $P(x, t)$ is obtained by calculating the inverse Fourier transform of the following coefficients:

$$P_{11}(\omega, x) = \mathcal{R}\left[\frac{v_x(\omega, x, \Delta z)}{v_x(\omega, x, 0)}\right] + \mathfrak{I}\left[\frac{v_z(\omega, x, 0)}{v_x(\omega, x, 0)}\right]\mathfrak{I}[P_{13}(\omega, x)]$$

$$P_{33}(\omega, x) = \mathcal{R}\left[\frac{v_z(\omega, x, \Delta z)}{v_z(\omega, x, 0)}\right] + \mathfrak{I}\left[\frac{v_x(\omega, x, 0)}{v_z(\omega, x, 0)}\right]\mathfrak{I}[P_{31}(\omega, x)],$$

$$P_{13}(\omega, x) = i\mathfrak{I}\left[\frac{v_x(\omega, x, \Delta z)}{v_x(\omega, x, 0)}\right]\left\{\mathcal{R}\left[\frac{v_z(\omega, x, 0)}{v_x(\omega, x, 0)}\right]\right\}^{-1},$$

$$P_{31}(\omega, x) = i\mathfrak{I}\left[\frac{v_z(\omega, x, \Delta z)}{v_z(\omega, x, 0)}\right]\left\{\mathcal{R}\left[\frac{v_x(\omega, x, 0)}{v_z(\omega, x, 0)}\right]\right\}^{-1}$$

where, $\mathcal{R}[v(\omega,x,z)]$ denotes the real part of $v(\omega,x,z)$ and $\mathfrak{I}[v(\omega,x,z)]$ is the imaginary part of $v(\omega,x,z)$, $v_x$ is the inline velocity component and $v_z$ the vertical velocity component.

13. The method of claim 9, wherein the inversion of the P-SV propagator for material properties is carried out in the frequency domain.

14. The method of claim 1, wherein the inversion for material properties is carried out for the surface wave component of the seismic signal.

15. The method of claim 1, wherein the propagator used is for an anisotropic or a transversely isotropic medium.

* * * * *